United States Patent [19]

Schmidt et al.

[11] Patent Number: 4,975,565
[45] Date of Patent: Dec. 4, 1990

[54] AUTOMATIC ADJUSTING DEVICE FOR A SIGHTING SYSTEM

[75] Inventors: Horst Schmidt, Wetzlar-Nauborn; Andreas Knipp, Braunfels, both of Fed. Rep. of Germany

[73] Assignee: Wild Leitz GmbH, Wetzlar, Fed. Rep. of Germany

[21] Appl. No.: 476,800

[22] Filed: Feb. 6, 1990

[30] Foreign Application Priority Data

Feb. 16, 1989 [DE] Fed. Rep. of Germany ....... 3904705

[51] Int. Cl.$^5$ ................................................ G01J 1/20
[52] U.S. Cl. .................................. 250/203.2; 356/152; 356/153
[58] Field of Search ........................... 250/203.2, 203.1; 356/141, 152, 153

[56] References Cited

U.S. PATENT DOCUMENTS

| | | | |
|---|---|---|---|
| 4,199,256 | 4/1980 | Forshufvud et al. | 356/141 |
| 4,423,957 | 1/1984 | Poole | 356/153 |
| 4,665,795 | 5/1987 | Carbonneau et al. | 356/152 |
| 4,878,752 | 11/1989 | Bramley | 356/152 |

FOREIGN PATENT DOCUMENTS 0254101 3/1987 European Pat. Off. .

Primary Examiner—David C. Nelms
Assistant Examiner—Que Tan Le
Attorney, Agent, or Firm—Foley & Lardner, Schwartz, Jeffery, Schwaab, Mack, Blumenthal & Evans

[57] ABSTRACT

The automatic adjusting device for a sighting system of a device which can be directed to a target, the automatic adjusting device having an autocollimator, comprising a light source, a splitter cube and an objective. The autocollimator generates an illuminated spot on a detector associated with the splitter cube. A tilting of a mirror secured to the device which can be directed to a target leads to a displacement of the illuminated spot, which displacement is convertible into electrical signals for the automatic adjustment of the sighting system. A prism which is invariant with respect to tiltings is disposed in the beam path of the autocollimator. This prism deflects the autocollimation beam path into a sighting system objective in such a manner that a virtual is generated in an intermediate image illuminated area image plane of the sighting system objective outside its beam path. As a result of the elimination of partially-mirror-coated surfaces in the sighting beam path, a disturbing influence due to superposition with the autocollimation beam path is avoided and, moreover, the transmission is improved.

7 Claims, 3 Drawing Sheets

AUTOMATIC ADJUSTING DEVICE FOR A SIGHTING SYSTEM

BACKGROUND OF THE INVENTION

The invention relates to an automatic adjusting device for a sighting system of an element which can be directed to a target, having an autocollimator consisting of a light source, a beam splitter and an objective, which images an illuminated area in autocollimation onto a position-sensitive detector.

EP-No. A2-0,254,101 discloses a device for the automatic adjustment of the sighting line of a sight for directing the tangent to the muzzle of an onboard cannon of an armored vehicle. The device exhibits a housing, in which an illumination unit, a splitter prism with a diaphragm, an objective and a quadrantal detector are fixedly disposed. The diaphragm, which is provided in the focal plane of the objective and is integrated in the splitter prism, is illuminated by means of the illumination unit. The objective forms an image of the illuminated diaphragm at infinity, which image is reflected by a reference mirror, which is erected firmly onto the on-board cannon and which represents the direction of the tangent to the muzzle, and is passed by the objective via the splitter prism to the quadrantal detector. In this way, angular deviations of the reference mirror can be detected and faulty adjustments can be appropriately compensated. In this known device, a partially-mirror-coated surface is required for the superposition of the adjusting (autocollimation) beam path and the target mark beam path (sighting beam path), whereby the transmission in both beam paths is reduced, which in turn requires the use of special light sources. In addition to this, as a result of the superposition of the adjusting beam path and the target mark beam, disturbances in the latter can occur.

SUMMARY OF THE INVENTION

It is therefore an object of the present invention to provide an automatic adjusting device for a sighting system of the above-mentioned type such that a high transmission is achieved both in the autocollimation beam path and in the sighting beam path and influences or disturbances of the sighting beam path are avoided.

In accomplishing the foregoing object an automatic adjusting device for a sighting system of a device which can be directed at a target is provided, the automatic adjusting device having an autocollimator comprising a light source, a beam splitter and an objective, which images an illuminated area in autocollimation onto a position-sensitive detector associated with the beam splitter, wherein the autocollimator is positioned such that an autocollimation beam path emitted by the autocollimator forms with the optical axis of a sighting beam path an angle which is greater than any maximum field angle occurring in the sighting beam path. The light source may be a LED or a laser diode.

Another embodiment of the present invention comprises positioning the autocollimator such that the autocollimation beam path generates a real image of an illuminated area outside the sighting beam path in an intermediate image plane of a sighting system objective.

Further objects, features and advantages of the present invention will become apparent from the detailed description of preferred embodiments that follows.

BRIEF DESCRIPTION OF THE DRAWINGS

Three illustrative embodiments of the present invention are diagrammatically represented in the drawings as follows.

DETAILED DESCRIPTION OF THE PREFERRED EMBODIMENTS

Figure 1:
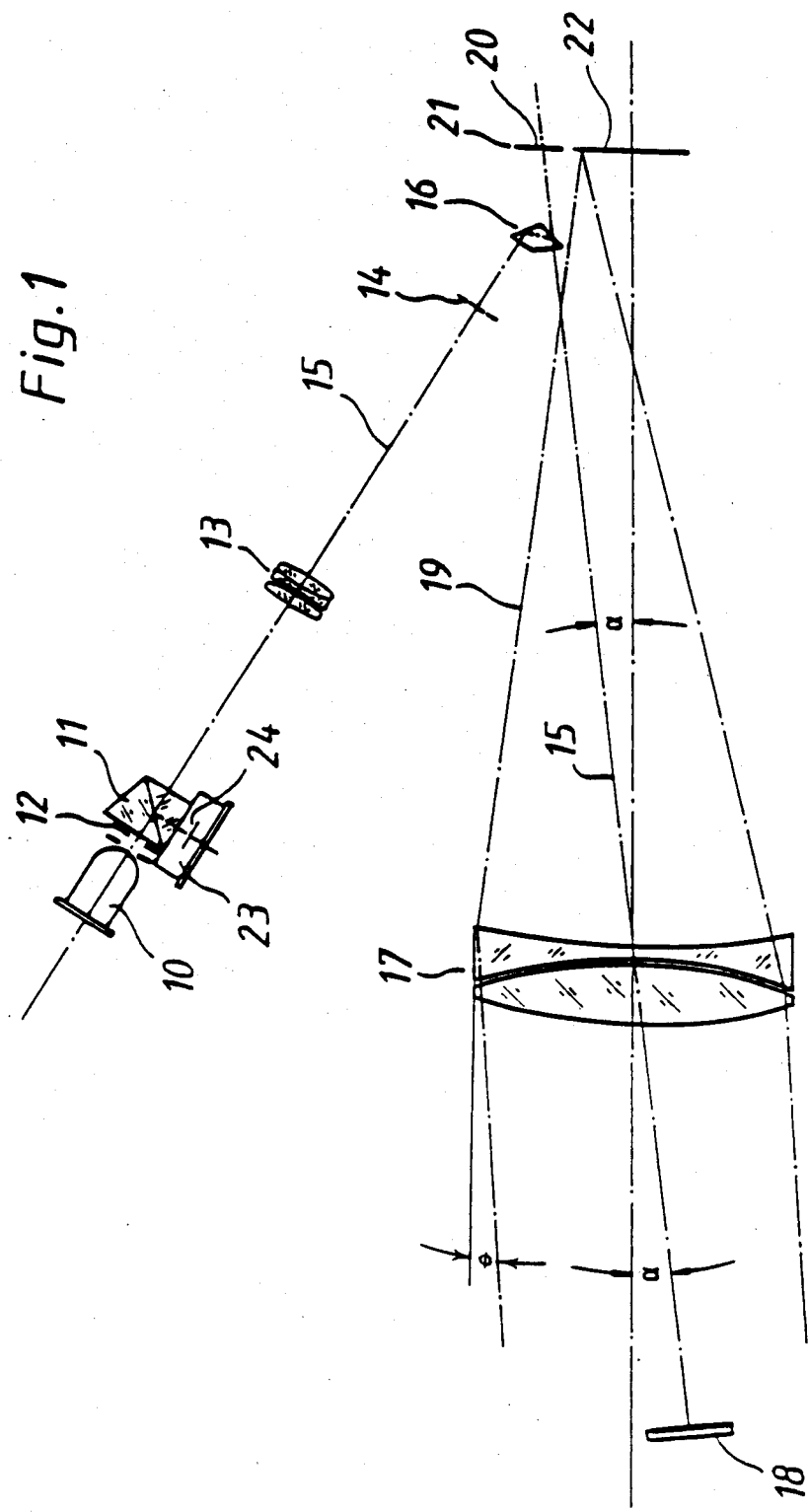
FIG. 1 shows the beam path of the adjusting device according to the invention in a first embodiment.

In the arrangement shown in FIG. 1, an LED is provided as light source 10, which LED illuminates a diaphragm 12 disposed in front of the splitter cube 11. The LED may illuminate the diaphragm 12 by means of a condenser which is not shown. An objective 13 generates a real image of the diaphragm 12 in its image plane 14. The light source 10, the splitter cube 11 and the objective 13 together form an autocollimator, the beam path of which is designated by 15. The autocollimation beam path 15 is deflected by means of a prism or reflective element 16 which is invariant with respect to tiltings. The latter is arranged in such a manner that the autocollimation beam path 15 emerges from a sighting system objective 17, after passage through the sighting system objective 17 and reflection at a mirror 18 fixedly connected to a device which can be directed to a target, at an angle $\alpha$, with respect to the optical axis of the sighting beam path 19, which is greater than any maximum field angle $\theta$ occurring in a sighting beam path 19. Field angle $\theta$ is the angle between the optical axis of the sighting beam path 19 and the principal ray of a marginal point of an object. In this manner, the diaphragm 12 is imaged as a virtual image 20 into a virtual image plane 21 of the sighting system objective 17, and specifically in a region of an intermediate image plane 22 which is conjugate with the image plane 14 and which is situated outside the sighting beam path 19. The autocollimation beam path 15 reflected at the mirror 18 passes via the sighting system objective 17, the prism 16 and the objective 13 as well as the splitter cube 11, to a position-sensitive detector 23, on the light-sensitive surface of which the image of the diaphragm 12 is focussed as illuminated area 24. A tilting of the mirror 18 leads to a displacement of this image, which displacement is convertible in a known manner into electrical signals, which permit an automatic adjustment of the sighting system.

Figure 2:
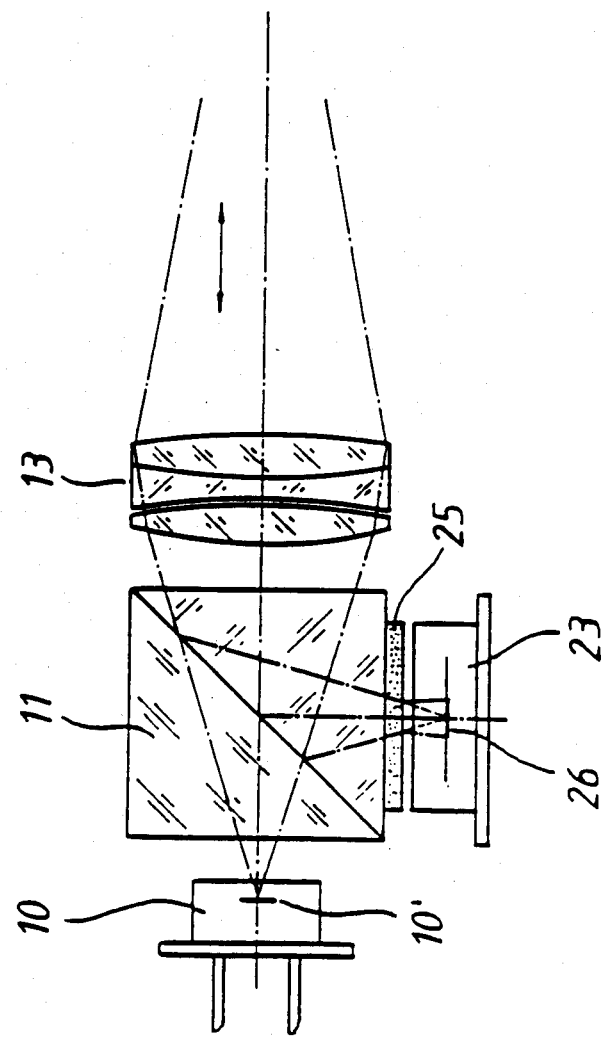
FIG. 2 shows a part of the beam path of a second embodiment.

The embodiment shown in FIG. 2 differs from that according to FIG. 1 in its construction in front of the objective 13; therefore, only this part of the autocollimation beam path 15 is shown. In this embodiment, a laser diode with an emitting surface 10' serves as light source 10. On account of the small emitting surface, the radiation emerges within a specified angular range and thus a diaphragm is not required. Instead, its place is taken by the emitting surface of the laser diode, which is disposed in such a manner that it is imaged virtually, in a manner corresponding to FIG. 1, into the intermediate image plane 22 of the sighting system objective 17 outside its beam path.

At an exit surface of the splitter cube 11, which exit surface is situated opposite the detector 23, there is disposed a diffusing screen 25, which generates on the detector surface a circle of confusion 26, the diameter of which can be matched to the detector 23 by altering the spacing between diffusing screen 25 and objective 13. On account of the small field angles occurring with a laser diode, geometric shadows in the beam path, for example due to contaminations on the mirror 18, would be almost sharply imaged on the detector 23. This would lead to an alteration of the adjustment null point. This effect is prevented by means of the diffusing screen 25.

Figure 3:
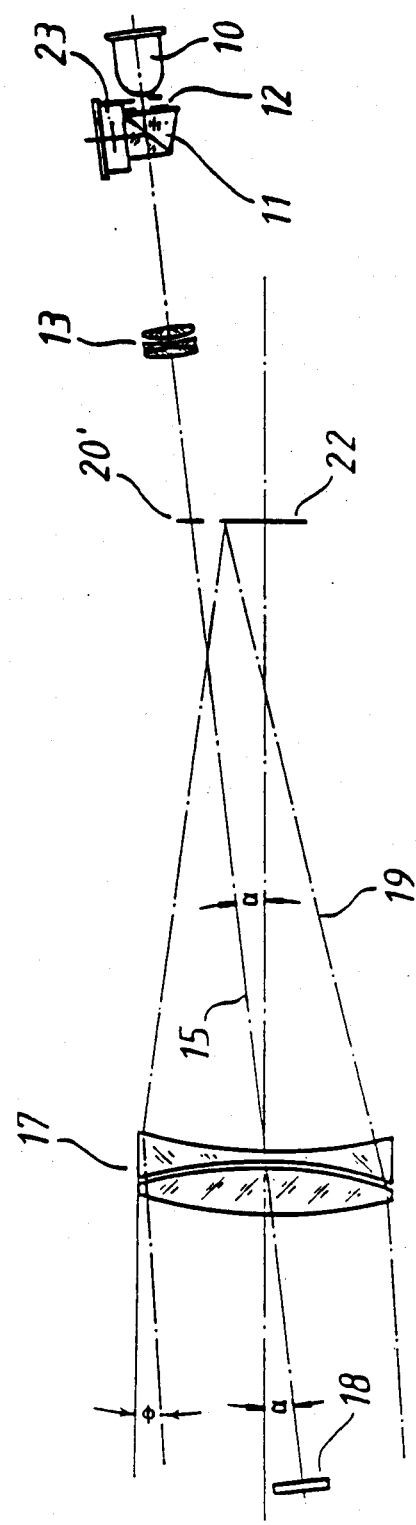
FIG. 3 shows a beam path of a further embodiment.

In a further embodiment, represented in FIG. 3, the autocollimator arrangement of elements 10, 11 and 13 together with the detector 23 may be disposed in the extension, shown in dot-dash lines, of the autocollimation beam path 15 impinging on the sighting system objective 17 at the angle a. In this embodiment, a reflecting element is not necessary. Instead, the autocollimation beam path 15 generates a real image 20' of the diaphragm 12 outside the sighting beam path 19 in the intermediate image plane 22 of the sighting system objective 17.

Variations of the described embodiments are possible. Thus, a neon lamp can be provided as light source 10 in place of the LED used in FIG. 1. Furthermore, the diffusing screen 25 can be disposed at a position different than that shown in FIG. 2, for example, between the splitter cube 11 and the objective 13 of the autocollimator.

What is claimed is:

1. An automatic adjusting device for a sighting system of a device which can be directed to a target, the automatic adjusting device having an autocollimator comprising a light source, a beam splitter and an objective, which images an illuminated area in autocollimation onto a position-sensitive detector associated with the beam splitter, wherein the autocollimator is positioned such that an autocollimation beam path generated by the autocollimator forms with the optical axis of a sighting beam path an angle which is greater than any maximum field angle occurring in the sighting beam path.

2. The automatic adjusting device as recited in claim wherein the beam splitter comprises a splitter cube.

3. The automatic adjusting device as recited in claim 2, wherein the light source comprises an LED which generates the image of a diaphragm disposed on the splitter cube as an illuminated area on a detector.

4. The automatic adjusting device as recited in claim 2, wherein the light source comprises a laser diode having an emitting surface which generates an image of a circle of confusion on the detector by means of a diffusing screen disposed between the splitter cube and the detector.

5. The automatic adjusting device as recited in claim 2, wherein there is disposed in the autocollimation beam path behind the objective a reflecting element, which deflects the autocollimation beam path into a sighting system objective in such a manner that in an intermediate image plane thereof a virtual image of the illuminated area is generated outside the sighting beam path.

6. The automatic adjusting device as recited in claim 5, wherein the reflecting element comprises a prism which is invariant with respect to tilting.

7. The automatic adjusting device as recited in claim 1, wherein the autocollimator is positioned such that the autocollimation beam path generates a real image of an illuminated area outside the sighting beam path in an intermediate image plane of a sighting system objective.

* * * * *